Dec. 4, 1956  H. N. ROSS  2,772,584
REVERSIBLE MECHANISM
Filed Oct. 12, 1954  2 Sheets-Sheet 1
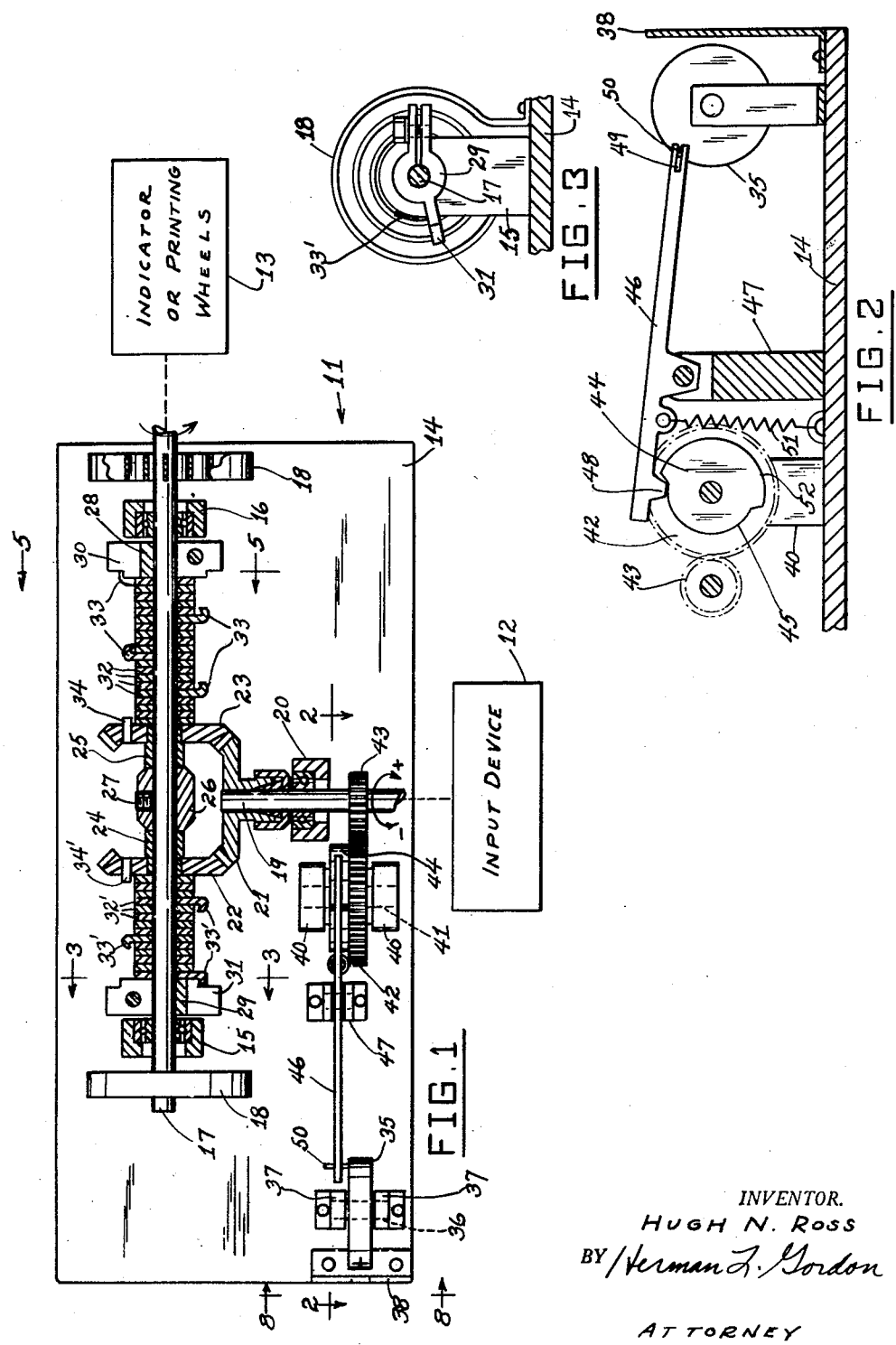
INVENTOR.
HUGH N. ROSS
BY Herman L. Gordon
ATTORNEY Dec. 4, 1956 H. N. ROSS 2,772,584
REVERSIBLE MECHANISM
Filed Oct. 12, 1954 2 Sheets-Sheet 2
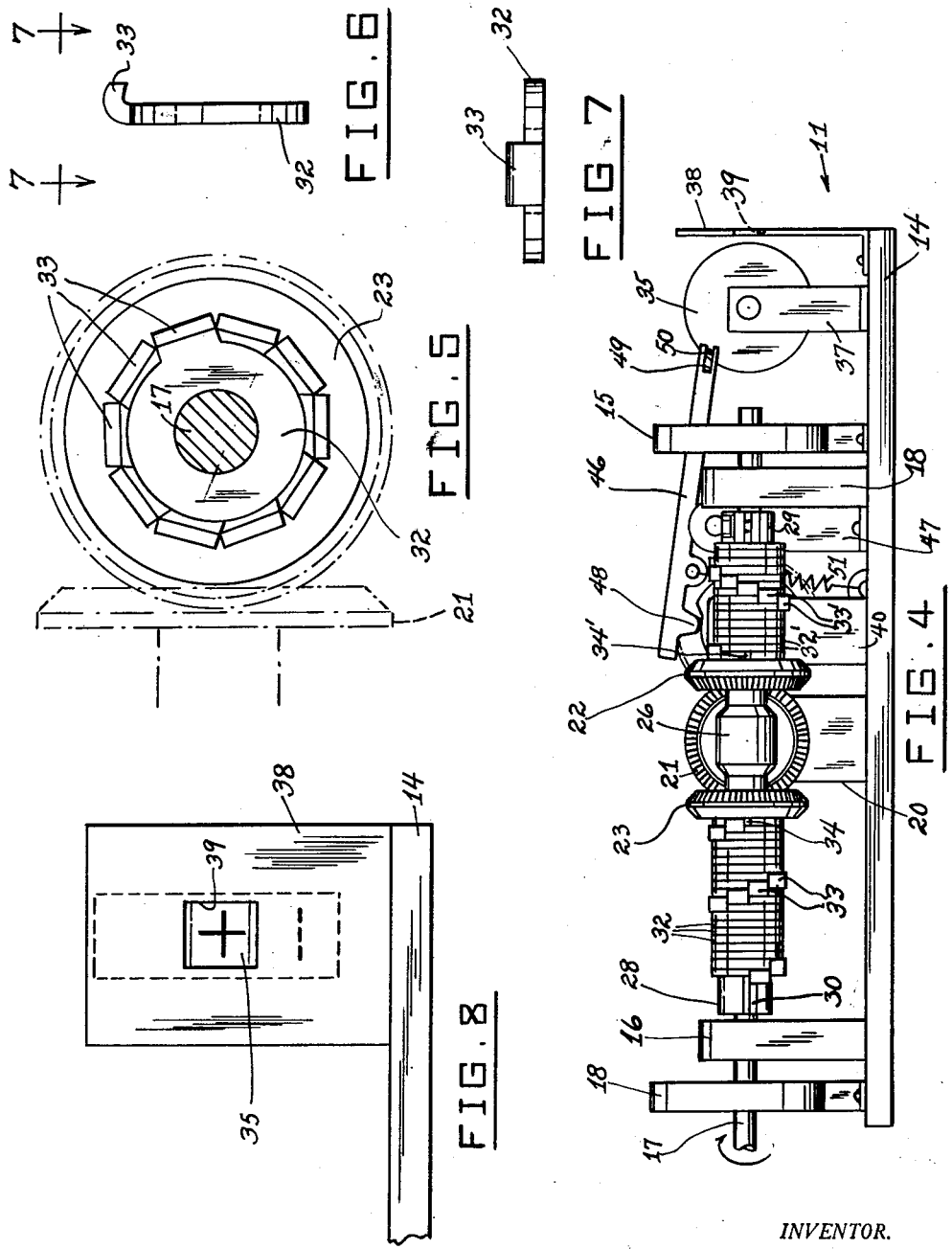
INVENTOR.
HUGH N. ROSS
BY Herman L. Gordon
ATTORNEY

United States Patent Office 2,772,584
Patented Dec. 4, 1956

2,772,584

REVERSIBLE MECHANISM

Hugh Neil Ross, Montgomery County, Md., assignor to American Instrument Company, Inc., Silver Spring, Md.

Application October 12, 1954, Serial No. 461,760

15 Claims. (Cl. 74—812)

This invention relates to reversible mechanisms, and more particularly to a mechanism for positively transmitting unidirectional movement to a driven member when an associated drive member moves either in a forward or a reverse direction from a reference position thereof.

A main object of the invention is to provide a novel and improved reversible drive mechanism arranged to provide positive drive in a fixed direction responsive to the excursion of the input force or torque in either direction from a reference condition.

A further object of the invention is to provide a novel and improved reversible drive mechanism for providing positive drive in a given direction in response to the application of input force or torque in either of two directions from a reference position, said mechanism being provided with means indicating the relative direction of the applied input force or torque.

A still further object of the invention is to provide an improved reversible drive mechanism suitable for use with a condition-responsive device to transmit positive unidirectional torque or force to an indicator or to a set of printing wheels.

A still further object of the invention is to provide an improved reversible drive mechanism for transmitting positive unidirectional force or torque, said mechanism being simple in construction, providing an indication of the direction of excursion of the input element thereof from a reference position, and being especially suitable for use in transmitting indications from a condition-responsive device, such as a temperature-responsive mechanism, a humidity-responsive mechanism, or the like, to a unidirectional indicating means, such as a register device of the type having indicating or printing wheels provided with numerical indicia of positive value.

Further objects and advantages of the invention will become apparent from the following description and claims, and from the accompanying drawings, wherein:

Figure 1 is a top plan view, partly in horizontal cross-section, of a reversible drive mechanism constructed in accordance with the present invention.

Figure 2 is a cross-sectional view taken on line 2—2 of Figure 1.

Figure 3 is a cross-sectional view taken on line 3—3 of Figure 1.

Figure 4 is a rear elevational view of the mechanism of Figure 1.

Figure 5 is an enlarged cross-sectional detail view taken on line 5—5 of Figure 1.

Figure 6 is an enlarged side elevational detail view of one of the drive washers employed in the mechanism of Figures 1 to 5.

Figure 7 is an elevational detail view taken on line 7—7 of Figure 6.

Figure 8 is an enlarged elevational detail view taken on line 8—8 of Figure 1.

Referring to the drawings, 11 generally designates a reversible drive mechanism according to the present invention, which may be employed, for example, between an input device 12 and an indicating or registering device 13.

The input device 12 may be any conventional condition-responsive device having an output shaft which rotates in accordance with variations in the condition to which it responds, for example, a temperature-responsive recorder mechanism of the self-balancing type having a self-balancing potentiometer means and employing a Wheatstone bridge circuit, this mechanism being well known in the art. Alternatively, the device 12 may be a humidity-responsive mechanism, or may even be a manually operated device which has an output shaft or similar member which may be rotated in either one direction or the other, and wherein it is desirable to record or indicate the excursions in both directions of the output member from a designated reference value or position of the output shaft.

The indicating or registering device 13 is also conventional and is of the type providing a positive indicated value with respect to a base or reference value, for example, with respect to zero, in the case of temperature indication. Thus, the device 13 may comprise a mechanism having indicating or printing wheels which can exhibit only positive value indications and which has no inherent means for indicating negative values. Thus, in the case of temperature variations, the mechanism 13 would ordinarily be suitable for providing indications of values above zero, or above such other reference value as may be selected.

The mechanism 11 comprises a base plate 14 on which are suitably mounted the spaced upstanding bearing brackets 15 and 16 in which is journalled the longitudinal shaft 17, said shaft being coupled directly to the input shaft of the indicating or registering device 13. Spiral springs 18, 18 surround the shaft 17 and are connected between shaft 17 and base plate 14, biasing shaft 17 towards a normal position corresponding to the zero, or other reference starting position, of the input shaft of the indicating or registering device 13. Thus, shaft 17 can only be rotated to positions spaced angularly in one direction from said zero or starting position of the shaft.

Designated at 19 is the input shaft of the device 11, said shaft 19 being journalled transverse to the shaft 17 on an upstanding bearing bracket 20 mounted on base plate 14. The output shaft of the input device 12 is connected directly to the input shaft 19.

Secured to the input shaft 19 is a bevel gear 21 which meshes with a pair of opposing similar bevel gears 22 and 23 secured on respective sleeve members 24 and 25 rotatably mounted on the intermediate portion of shaft 17 on opposite sides of a spacer sleeve 26 secured on said shaft 17, as shown, as by a set screw 27. Clamped on shaft 17 inwardly adjacent the bearing bracket 16 is a first drive collar 28. A second drive collar 29 is clamped on shaft 17 inwardly adjacent bearing bracket 15.

Drive collar 28 is formed with the outwardly projecting driving arm 30, and drive collar 29 is formed with a similar outwardly projecting drive arm 31.

Loosely mounted on shaft 17 between bevel gear 23 and drive collar 28 are a plurality of washers 32, said washers each being formed with an outwardly projecting hooked lug 33, the lugs 33 projecting in the same direction, namely toward the drive collar 28, as shown in Figure 1. Secured to the bevel gear 23 is drive pin 34 which is drivingly engageable with the lug 33 of the adjacent washer 32, whereby the gear may transmit torque in a counterclockwise direction, as viewed from the right end of the device in Figure 1, to the adjacent washer 32. The lugs 33 are of such width that they will successively engage each other, and the lug 33 on the right end washer 32 will engage the arm 30 of collar 28, for positively transmitting such counterclockwise torque when the input shaft 19 is in the reference position thereof, for example, in its "zero" position. Thus, when the input device 12 applies a clockwise torque to shaft 19, as viewed from the front of the device 11 in Figure 1, bevel gear 21 will rotate, and will cause bevel gear 23 and driving pin 34 to transmit driving torque through the interengaging lugs 33 to the drive arm 30, to cause shaft 17 to rotate counterclockwise, as viewed from the right side of the device in Figure 1. This rotation of shaft 17 will produce a positive indication or setting of the changeable element or elements of the device 13. When the aforesaid clockwise, or "positive" input torque on the shaft 19 is removed or relaxed, the springs 18 return the shaft 17 toward its "zero" or reference position.

Loosely mounted on shaft 17 between bevel gear 22 and drive collar 29 are a plurality of washers 32', similar to washers 32, and having hooked lugs 33' directed toward drive collar 29. Secured on bevel gear 22 is a drive pin 34' which is engageable with the lug 33' of the adjacent washer 32'. The lug 33' on the washer 32' adjacent collar 29 is engageable with the drive arm 31 to transmit counterclockwise driving torque thereto, as viewed from the right end of the device in Figure 1. Thus, the lugs 32' are of such width that when they are interlocked, and the lug 33' adjacent the collar 29 engages arm 31, the pin 34' will be in driving engagement with the lug 33' of the washer adjacent bevel gear 22 when the shaft 19 is in its reference or "zero" position. When shaft 19 rotates in its "negative," or counterclockwise, direction from its aforesaid reference or "zero" position, as viewed from the front of the device in Figure 1, bevel gear 22 is rotated counterclockwise, as viewed from the right end of the device, and transmits counterclockwise driving torque to shaft 17 through pin 34', lugs 33', and arm 31. This again causes shaft 17 to provide a "positive" indication or setting of the changeable element or elements of the device 13.

In order to indicate whether the input device 12 is operating above or below its reference or "zero" condition, a range indicating wheel 35 is provided. Wheel 35 is journalled on a horizontal shaft 36 supported on suitable brackets 37, 37 mounted on base plate 14. An apertured viewing plate 38 is secured to plate 14, the aperture 39 of plate 38 providing a view of the periphery of wheel 35 adjacent thereto, as shown in Figure 8. Said periphery is provided with suitable spaced indication marks or embossments, such as plus and minus signs to respectively signify the ranges above and below the reference or "zero" position of shaft 19.

Journalled between suitable supports 40, 40 is a horizontal shaft 41 on which is mounted a gear 42 meshing with a gear 43 on shaft 19. Also mounted on shaft 41 is a cam 44 having a notched portion 45 of reduced radius. Designated at 46 is a lever pivotally mounted at its intermediate portion on an upstanding support 47 secured to plate 14. One end portion of lever 46 has a depending follower lug 48 engaging the periphery of cam 44. The other end portion of lever 46 is formed with a slot 49 slidably engaging a laterally projecting pin 50 carried by wheel 35. A coiled spring 51 connects lever 46 to base plate 14, said spring being located between follower lug 48 and the pivotal connection of lever 46 to support 47, as shown in Figure 2, to bias the follower lug 48 against the periphery of the cam.

When follower lug 48 is in the position shown in Figure 2, namely, is at the clockwise end of notch 45, wheel 35 provides a normal or "plus" indication through the viewing aperture 39 of plate 38. When cam 44 is rotated counterclockwise from its position of Figure 2, follower lug 48 is forced onto the larger radius portion 52 of cam 44, causing lever 46 to rotate clockwise, thus causing wheel 35 to rotate counterclockwise, moving the "negative" indication into view through the aperture 39. This occurs when shaft 19 rotates counterclockwise, as viewed from the front of the device in Figure 1, through its reference or "zero" position, since the rotation of shaft 19 is transmitted to cam 44 by the meshing gears 43 and 42.

From the above, it will be apparent that regardless of the direction of rotation of input shaft 19 (within the design range of the device), the shaft 17 can be positively driven in only one direction by the bevel gears 22 and 23, for example, in a counterclockwise direction, as viewed from the right side of the device in Figure 1. The springs 18 merely act to urge the shaft 17 toward its "zero" or reference position. When one of the bevel gears is driving, the other bevel gear is inoperative, since the lugs of its associated washers are not in driving interengagement and said washers are in a floating condition on the shaft 17.

The range-indicating wheel 35 may obviously be a printing wheel and may be employed to record the positive or negative nature of the position of input shaft 19 simultaneously with the numerical record provided by the printing wheels of the device 13.

When the input shaft 19 returns to its "zero" position, the output shaft 17, under the biasing force of the springs 18, also returns to "zero" position, at which time the "positive" drive lugs 33 are ready to unlock. The "negative" drive lugs 33' are now ready to lock and to drive the output shaft 17 in the same direction away from the "zero" position as said output shaft was driven by the "positive" drive lugs (giving the same type of indication on the device 13 for values below "zero" as for values above "zero").

The auxiliary wheel 35 registers the passage of the input shaft 19 through "zero" by the action of the cam 44, whereby wheel 35 and device 13 together provide an absolute indication of the position of input shaft 19.

The above described device may be employed in any recording or indicating device where the range includes zero, such as a device for measuring temperature, relative pressure, or the like, or for measuring deviations from an arbitrary reference value, as in length gauges, or in frequency-measuring devices where the frequency depends on the position of a tuning shaft, or the like.

The input shaft 19 may be operated by any condition-responsive device which covers a range wherein "zero" is in the intermediate portion of the range.

The mechanism is applicable to any system having a self-balancing type of responsive mechanism, as for example, self-balancing bridge devices wherein the responsive element rotates in accordance with variations in the condition being measured.

While a specific embodiment of a reversible drive mechanism has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. In a mechanism of the character described, an input element having a unique reference position and being movable in opposite directions through said reference position, an output element, means coupling said input element to said output element and arranged to drive said output element in one direction only, regardless of the direction of movement of said input element, and means operating in response to the passage of said input element through said reference position indicating the direction of excursion of said input element from said unique reference position thereof.

2. In a mechanism of the character described, an input element having a unique reference position and being movable in opposite directions through said reference position, an output element, means coupling said input element to said output element and arranged to drive said output element in one direction only, regardless of the direction of movement of said input element, and indicating means operated in response to the movement of said input element through said unique reference position thereof.

3. In a mechanism of the character described, an input element, an output element, means coupling said input element to said output element and arranged to drive said output element in one direction only, regardless of the direction of movement of said input element, indicating means operated in response to the movement of said input element through a predetermined reference position thereof, and means biasing said output element toward a position corresponding to said predetermined reference position of said input element.

4. In a mechanism of the character described, an input shaft having a unique reference position and being movable in opposite directions through said reference position, an output shaft, means coupling said input shaft to said output shaft and arranged to drive said output shaft in one direction of rotation only, regardless of the direction of rotation of said input shaft, and indicating means operated in response to the movement of said input shaft through said unique reference position thereof.

5. In a mechanism of the character described, an input shaft, an output shaft, means coupling said input shaft to said output shaft and arranged to drive said output shaft in one direction of rotation only, regardless of the direction of rotation of said input shaft, indicating means operated in response to the rotation of said input shaft through a predetermined reference position thereof, and means biasing said output shaft toward a position corresponding to said reference position of the input shaft.

6. In a mechanism of the character described, an input shaft, a first gear drivingly connected to said input shaft, an output shaft, respective second and third gears rotatably mounted on said output shaft and meshing with said first gear, means drivingly coupling said second gear to said output shaft responsive to the rotation of said input shaft in one direction beyond a predetermined reference position thereof, and means drivingly coupling said third gear to said output shaft responsive to the rotation of said input shaft in the opposite direction beyond said reference position.

7. In a mechanism of the character described, an input shaft, a first gear drivingly connected to said input shaft, an output shaft, respective second and third gears, means rotatably supporting said second and third gears in meshing engagement with said first gear, means drivingly coupling said second gear to said output shaft responsive to the rotation of said input shaft in one direction beyond a predetermined reference position thereof, and means drivingly coupling said third gear to said output shaft responsive to the rotation of said input shaft in the opposite direction beyond said reference position.

8. The structure of claim 7, and wherein said coupling means is arranged to transmit driving torque to the output shaft in one direction only, regardless of the direction of rotation of the input shaft.

9. The structure of claim 7, and means indicating the direction of rotation of said input shaft from said predetermined reference position.

10. The structure of claim 7, and indicating means operated in response to the rotation of said input shaft through said reference position.

11. In a mechanism of the character described, an input shaft, a first gear drivingly mounted on said input shaft, an output shaft arranged at right angles to said input shaft, respective second and third gears rotatably mounted on said output shaft and meshing with opposite portions of said first gear, whereby said second and third gears are rotated in opposite directions by said input shaft, respective drive members secured to said output shaft and spaced respectively from said second and third gears, and driving means mounted on the output shaft between the second and third gears and the respective drive members, said driving means being arranged to drivingly couple the second gear to one of said drive members when the input shaft rotates in one direction beyond a reference position thereof and to drivingly couple the third gear to the other drive member when the input shaft rotates in the opposite direction beyond said reference position, whereby the output shaft can be driven in only one direction by said input shaft.

12. The structure of claim 11, and indicating means operated in response to the rotation of said input shaft through said reference position.

13. The structure of claim 11, and means biasing the output shaft toward a predetermined reference position.

14. The structure of claim 11, and wherein said driving means comprises respective groups of washers rotatably mounted adjacent to each other on the output shaft, said washers each having a lug projecting toward the associated drive member, said lugs being interengageable with each other and with the associated drive member, and respective projections on the second and third gears engageable with the lugs of the adjacent washers.

15. The structure of claim 14, and means biasing the output shaft toward a position wherein the lugs on the washers of both groups are substantially interlocked and are substantially in driving relation to the respective drive members and the projections on the second and third gears are substantially in driving engagement with the lugs of said adjacent washers.

References Cited in the file of this patent
UNITED STATES PATENTS
1,736,064   Walker _____ Nov. 19, 1929